US012597289B2

(12) United States Patent
Norieda et al.

(10) Patent No.: US 12,597,289 B2
(45) Date of Patent: Apr. 7, 2026

(54) IMAGE ACCUMULATION APPARATUS, METHOD, AND NON-TRANSITORY COMPUTER-READABLE MEDIUM

(71) Applicant: NEC Corporation, Tokyo (JP)

(72) Inventors: Shin Norieda, Tokyo (JP); Hiroo Harada, Tokyo (JP); Haruki Mizutani, Tokyo (JP); Hirotaka Maeshima, Tokyo (JP); Masami Sakaguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 339 days.

(21) Appl. No.: 18/273,748

(22) PCT Filed: Feb. 3, 2022

(86) PCT No.: PCT/JP2022/004293
§ 371 (c)(1),
(2) Date: Jul. 21, 2023

(87) PCT Pub. No.: WO2022/181287
PCT Pub. Date: Sep. 1, 2022

(65) Prior Publication Data
US 2024/0104956 A1      Mar. 28, 2024

(30) Foreign Application Priority Data

Feb. 25, 2021     (JP) ................................. 2021-029035

(51) Int. Cl.
*G06V 40/16*          (2022.01)
*G06F 3/04817*       (2022.01)
*G10L 25/63*          (2013.01)

(52) U.S. Cl.
CPC .......... *G06V 40/172* (2022.01); *G06V 40/174* (2022.01); *G06F 3/04817* (2013.01); *G10L 25/63* (2013.01)

(58) Field of Classification Search
CPC ........... G06F 2203/011; G06F 3/04817; G06F 3/167; G06T 7/20; G06V 40/172; G06V 40/174; G06V 40/175; G10L 25/63
See application file for complete search history.

(56) References Cited

U.S. PATENT DOCUMENTS

2012/0169895 A1*   7/2012  Wan ..................... H04N 23/611
                                                              348/222.1
2017/0047096 A1*   2/2017  Li ........................... G11B 27/34

FOREIGN PATENT DOCUMENTS

JP          2002-077592 A        3/2002
JP          2008-193563 A        8/2008
(Continued)

OTHER PUBLICATIONS

International Search Report for PCT Application No. PCT/JP2022/004293, mailed on Apr. 26, 2022.

*Primary Examiner* — Ruiping Li
(74) *Attorney, Agent, or Firm* — Sughrue Mion, PLLC

(57)          ABSTRACT

An object is to provide an image accumulation apparatus, a method, and a non-transitory computer-readable medium capable of extracting a characteristic video based on an individual emotion. An image accumulation apparatus according to the present disclosure includes an image acquisition unit, an expression classification unit, and an image accumulation unit. The image acquisition unit acquires image data. The expression classification unit classifies face image data included in the image data into a predetermined emotion. The image acquisition unit accumulates the image data associated with emotion identifiers for identifying the classified emotions so that the image data is distributable to a terminal.

16 Claims, 9 Drawing Sheets

(56) References Cited

FOREIGN PATENT DOCUMENTS

| | | | |
|----|--------------|-----|---------|
| JP | 2009-253931  | A   | 10/2009 |
| JP | 2013-242434  | A   | 12/2013 |
| JP | 2019-125870  | A   | 7/2019  |
| WO | 2018/016142  | A1  | 1/2018  |

* cited by examiner

1

IMAGE ACQUISITION UNIT   11

EXPRESSION CLASSIFICATION UNIT   22

IMAGE ACCUMULATION UNIT   210

IMAGE ACCUMULATION APPARATUS, METHOD, AND NON-TRANSITORY COMPUTER-READABLE MEDIUM

This application is a National Stage Entry of PCT/JP2022/004293 filed on Feb. 3, 2022, which claims priority from Japanese Patent Application 2021-029035 filed on Feb. 25, 2021, the contents of all of which are incorporated herein by reference, in their entirety.

TECHNICAL FIELD

The present invention relates to an image accumulation apparatus, a method, and a non-transitory computer-readable medium.

BACKGROUND ART

Patent Literature 1 discloses a technique of recognizing at least one of an action and an expression of a specific individual based on an acquisition result obtained by acquiring an image of the individual, recognizing a characteristic video scene of the individual based on a recognition result, and extracting the specific image from an acquisition result.

CITATION LIST

Patent Literature

Patent Literature 1: Japanese Unexamined Patent Application Publication No. 2019-125870

SUMMARY OF INVENTION

Technical Problem

In Patent Literature 1, an external feature such as an individual action or expression is used to extract an image including a specific characteristic image. However, Patent Literature 1 has a problem that it is not possible to analyze emotions that are individual inner parts and it is not possible to extract a characteristic video scene based on the individual emotions.

In view of such a problem, an object of the present disclosure is to provide an image accumulation apparatus, a method, and a non-transitory computer-readable medium capable of extracting a characteristic video scene based on individual emotions.

Solution to Problem

According to an aspect of the present disclosure, an image accumulation apparatus includes: an image acquisition unit configured to acquire image data; an expression classification unit configured to classify face image data included in the image data into predetermined emotions; and an image acquisition unit configured to accumulate the image data associated with emotion identifiers for identifying the classified emotions so that the image data is distributable to a terminal.

According to another aspect of the present disclosure, an image accumulation apparatus includes: image acquisition means for acquiring image data; voice acquisition means for acquiring voice data corresponding to the image data; voice emotion classification means for classifying an emotion of a person from the voice data; and image accumulation means for accumulating the image data associated with emotion identifiers for identifying the classified emotions so that the image data is distributable to a terminal.

According to still another aspect of the present disclosure, a method includes: acquiring image data; classifying face image data included in the image data into predetermined emotions; and accumulating the image data associated with emotion identifiers for identifying the classified emotions so that the image data is distributable to a terminal.

According to still another aspect of the present disclosure, a program causes a computer to perform: a process of acquiring image data; a process of classifying face image data included in the image data into predetermined emotions; and a process of accumulating the image data associated with emotion identifiers for identifying the classified emotions so that the image data is distributable to a terminal.

Advantageous Effects of Invention

According to the present disclosure, it is possible to provide an image accumulation apparatus, a method, and a non-transitory computer-readable medium capable of extracting a characteristic video scene based on an individual emotion.

EXAMPLE EMBODIMENT

Figure 1:
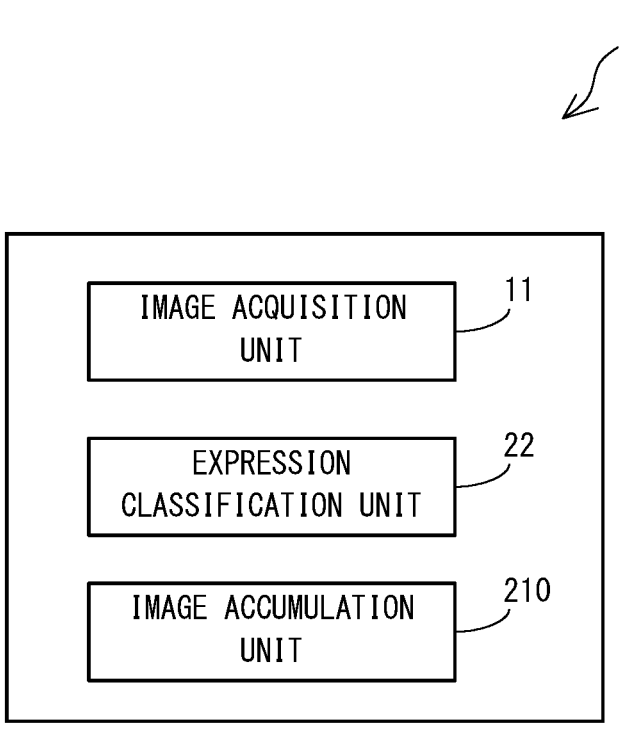
FIG. 1 is a block diagram illustrating a configuration of an image accumulation apparatus according to a first example embodiment.

Hereinafter, example embodiments of the present disclosure will be described in detail with reference to the drawings. In the drawings, the same or corresponding elements are denoted by the same reference numerals, and repeated description is omitted as necessary for clear description.

An "image" described in example embodiments includes a still image and a moving image.

First Example Embodiment

First, a configuration of an image accumulation apparatus 1 according to a first example embodiment will be described with reference to FIG. 1. The image accumulation apparatus 1 includes an image acquisition unit 11, an expression classification unit 22, and an image accumulation unit 210.

The image acquisition unit 11 acquires image data. The expression classification unit 22 classifies face image data included in the image data into predetermined emotions. The image accumulation unit 210 accumulates image data associated with emotion identifiers for identifying the classified emotions so that the image data is distributable to a terminal.

Figure 2:
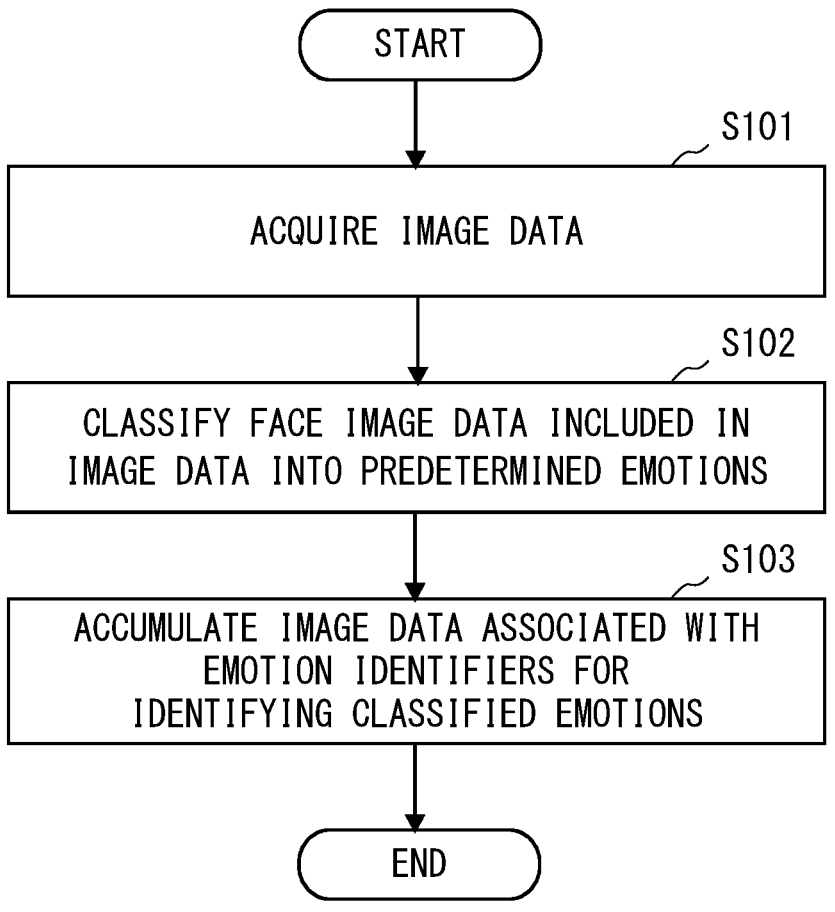
FIG. 2 is a flowchart illustrating an operation of the image accumulation apparatus according to the first example embodiment.

Next, an operation of the image accumulation apparatus 1 according to the first example embodiment will be described with reference to FIG. 2.

First, the image acquisition unit 11 acquires image data (step S101). Subsequently, the expression classification unit 22 classifies the face image data included in the image data into predetermined emotions (step S102). Subsequently, the image accumulation unit 210 accumulates the image data associated with emotion identifiers for identifying the classified emotions so that the image data is distributable to the terminal (step S103).

Accordingly, the image accumulation apparatus 1 according to the first example embodiment can extract a characteristic video scene by analyzing an emotion that is an individual inner part from an external feature such as an individual expression using the individual emotion as a trigger.

Second Example Embodiment

Figure 3:
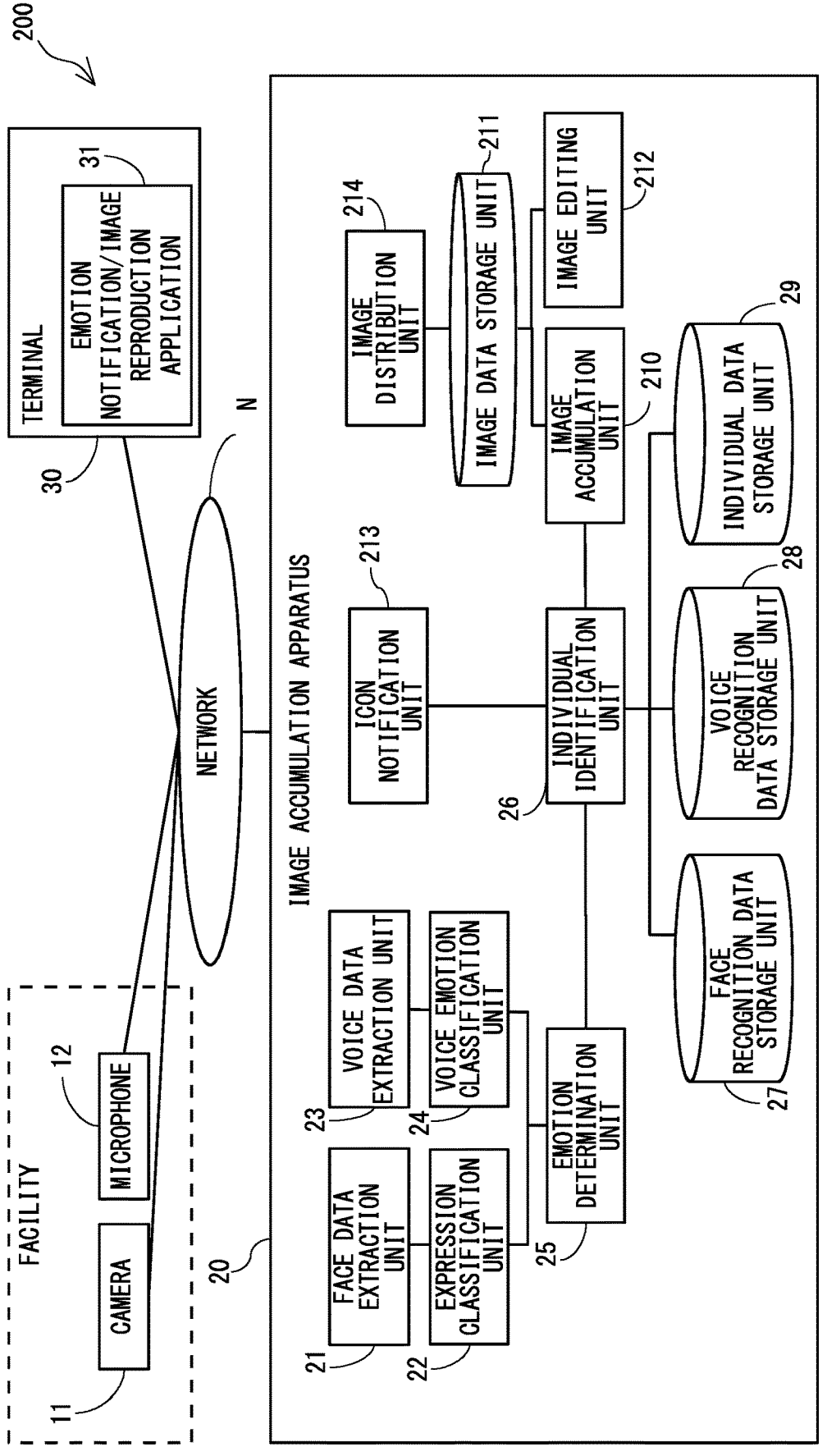
FIG. 3 is a block diagram illustrating a configuration of an image accumulation system according to a second example embodiment.

Next, a configuration of an image accumulation system 200 according to a second example embodiment will be described with reference to FIG. 3. In the second example embodiment, the first example embodiment will be specifically described.

The image accumulation system 200 includes a camera (image acquisition unit) 11, a microphone (voice acquisition unit) 12, an image accumulation apparatus 20, and a terminal 30. The image accumulation system 200 is installed in, for example, a kindergarten, and can accumulate video scenes in which children have characteristic emotions from among images obtained by imaging daily events in the kindergarten. Then, parents of the children can acquire specific images selected from the accumulated specific images. A place where the image accumulation system 200 is installed is not limited to a kindergarten, and may be any place where users can enjoy watching states of children.

The camera 11 is a fixed camera installed in a facility such as a kindergarten and communicates with the image accumulation apparatus 20 wirelessly or by wire via the network N. The camera 11 captures images of the facility such as a kindergarten, and transmits captured image data to the image accumulation apparatus 20. Here, the captured images are still images or moving images.

The microphone 12 is a microphone installed in a facility such as a kindergarten and communicates with the image accumulation apparatus 20 wirelessly or by wire via the network N. The microphone 12 acquires voices of a facility such as a kindergarten, and transmits acquired voice data to the image accumulation apparatus 20.

The image accumulation apparatus 20 is a server that communicates with the camera 11, the microphone 12, and the terminal 30 wirelessly or by wire via the network N. The image accumulation apparatus 20 includes a face data extraction unit 21, an expression classification unit 22, a voice data extraction unit 23, a voice emotion classification unit 24, an emotion determination unit 25, an individual identification unit 26, a face recognition data storage unit 27, a voice recognition data storage unit 28, an individual data storage unit 29, an image accumulation unit 210, an image data storage unit 211, an image editing unit 212, an icon notification unit 213, and an image distribution unit 214.

The face data extraction unit 21 extracts face image data of a predetermined person from the image data using the image data acquired from the camera 11. The face data extraction unit 21 supplies the extracted face image data to the expression classification unit 22.

The expression classification unit 22 analyzes the face image data acquired from the face data extraction unit 21 and generates emotion data including information obtained by classifying what kind of emotions the person has. The above-described emotions are, for example, emotions such as joy, sorrow, empathy, surprise, presence, attention, confusion, disdain, disgust, and fear.

The voice data extraction unit 23 extracts individual voice data from the voice data using the voice data acquired from the microphone 12. The voice data extraction unit 23 supplies the extracted individual voice data to the voice emotion classification unit 24.

The voice emotion classification unit 24 analyzes the individual voice data acquired from the voice data extraction unit 23, and generates emotion data including information obtained by classifying what kind of emotions a person has. Like the emotions analyzed by the expression classification unit 22, the above-described emotions are emotions such as joy, sorrow, empathy, surprise, presence, attention, confusion, disdain, disgust, and fear.

The emotion determination unit 25 determines whether the emotions of the person classified by the expression classification unit 22 or the voice emotion classification unit 24 are a specific emotion by using the emotion data acquired from the expression classification unit 22 or the voice emotion classification unit 24. Here, the specific emotion such as "joy" and "sorrow" is set in advance. When the emotion determination unit 25 determines that the emotion of the person is a specific emotion, the emotion determination unit 25 generates a specific emotion identifier indicating the specific emotion, and supplies the specific emotion identification and the face image data or the voice data to the individual identification unit 26.

The individual identification unit 26 identifies a person from the acquired face image data with reference to the face recognition data stored in the face recognition data storage unit 27 and the individual data stored in the individual data storage unit 29. When the person can be identified, the individual identification unit 26 acquires an individual identifier for identifying the person. The individual identification unit 26 identifies the person from the acquired individual voice data with reference to the voice recognition data stored in the voice recognition data storage unit 28 and the individual data stored in the individual data storage unit 29. When the person can be identified, the individual identification unit 26 acquires an individual identifier for identifying the person. Then, the individual identification unit 26 supplies the acquired individual identifier and the specific emotion identifier to the image accumulation unit 210.

The image accumulation unit 210 extracts a specific image corresponding to the specific emotion from the image data acquired from the camera 11. Specifically, the image accumulation unit 210 extracts, from the image data acquired from the camera 11, the specific image within a predetermined range before and after a time point at which the emotion is determined to be the specific emotion. For example, the specific image indicates a moving image for 10 seconds before and after the time point at which a child showed an emotion of "joy" among the moving images acquired from the camera 11. Then, the image accumulation unit 210 accumulates the extracted specific image, the individual identifier, and the specific emotion identifier in the image data storage unit 211 in association.

The image editing unit 212 edits the specific image stored in the image data storage unit 211. For example, in the specific image stored in the image data storage unit 211, the image editing unit 212 performs editing by a masking process such as blurring on the face of a person other than the person corresponding to the associated individual identifier.

The icon notification unit 213 outputs emotion icons to the terminal 30 via the network N. The emotion icons are icons representing specific emotions such as "joy" and "sorrow" and at least one type of emotion icons is generated. Here, a user of the terminal 30 can select an emotion of a specific image to be reproduced by selecting the emotion icon output to the terminal 30. In addition, the icon notification unit 213 may output a difference between a time at which the person has a specific emotion and a current time to the terminal 30 in association with the emotion icon.

The image distribution unit 214 receives an instruction from the terminal via the network N, acquires the specific image corresponding to the emotion icon from the image data storage unit 211, and distributes the acquired specific image to the terminal 30.

The terminal 30 is, for example, a mobile terminal such as a smartphone or a tablet, or a fixed terminal such as a personal computer (PC). The terminal 30 includes an emotion notification/image reproduction application 31 used for the user of the terminal 30 to receive a distributed image from the image accumulation apparatus 20. The emotion notification/image reproduction application 31 outputs the emotion icon received from the icon notification unit 213 of the image accumulation apparatus 20 to a display, and transmits information regarding the emotion icon selected by the user to the image accumulation apparatus 20. The emotion notification/image reproduction application 31 outputs the specific image received from the image distribution unit 214 of the image accumulation apparatus 20 to the display.

Figure 4:
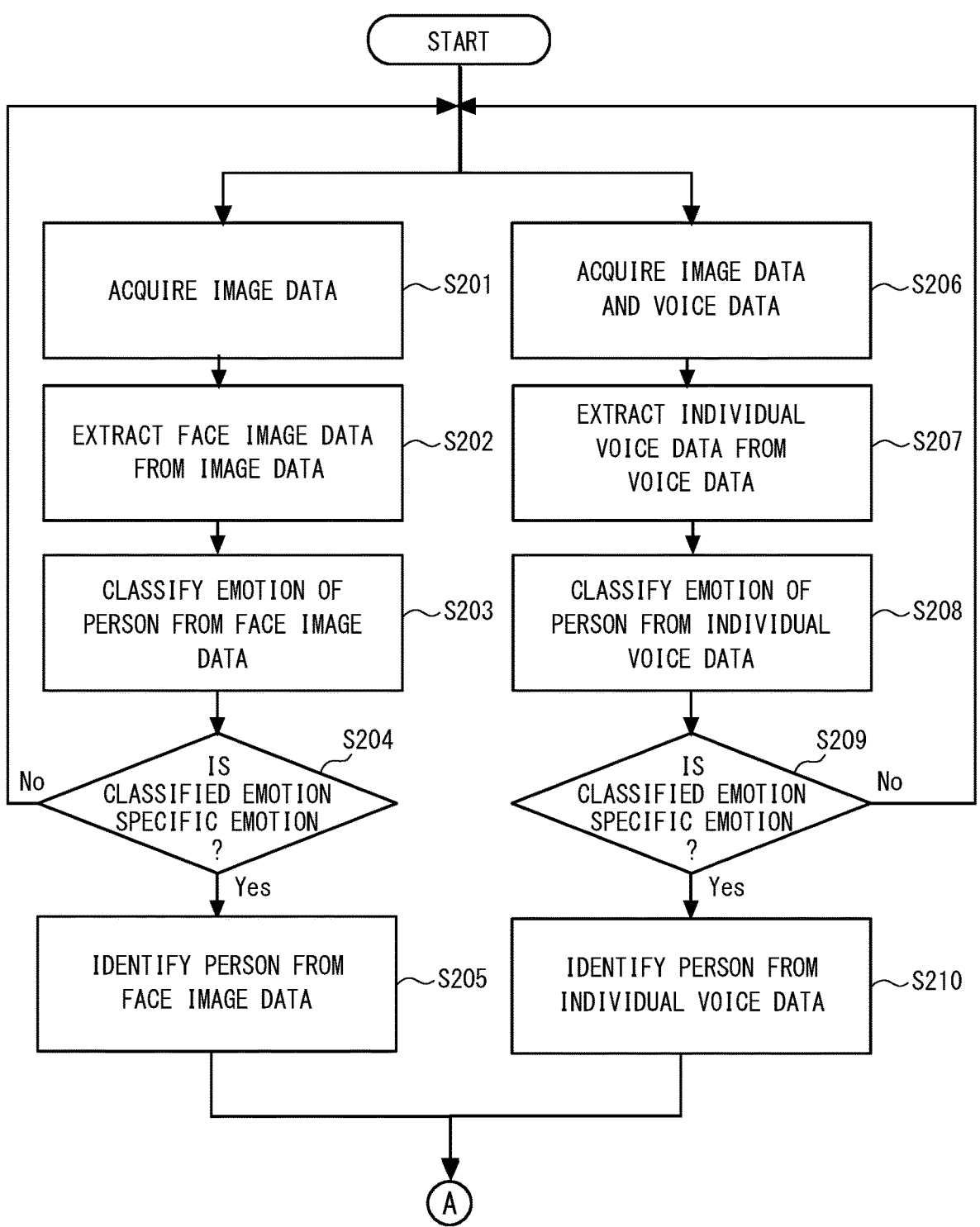
FIG. 4 is a flowchart illustrating an operation of the image accumulation system according to the second example embodiment.
Figure 5:
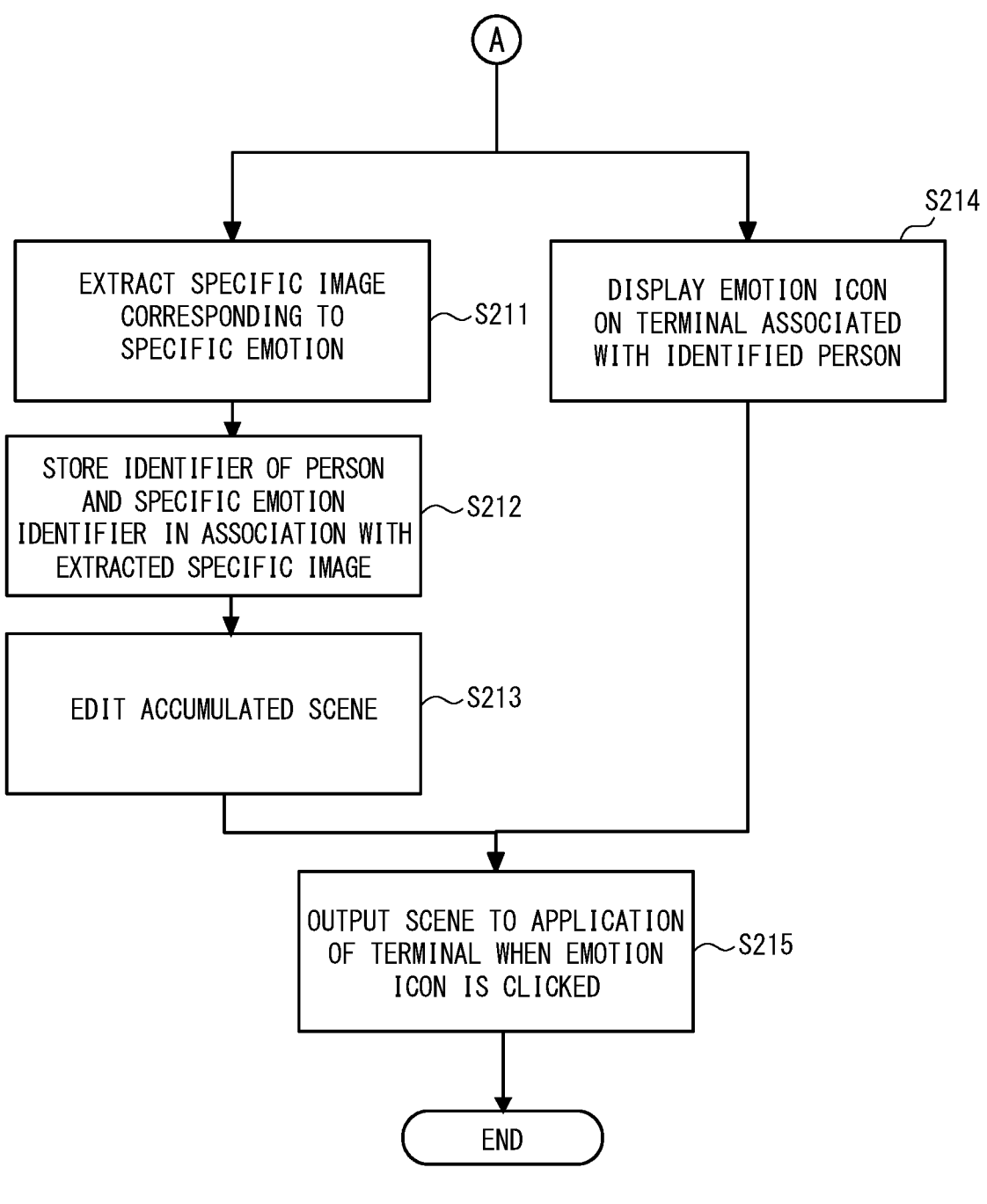
FIG. 5 is a flowchart illustrating an operation of the image accumulation system according to the second example embodiment.

Next, an example of an operation of the image accumulation system 200 according to the second example embodiment will be described with reference to FIGS. 4 to 5. In FIGS. 4 to 5, an example when the image accumulation system 200 is installed in a kindergarten will be described.

First, the camera 11 captures an image in the kindergarten, and transmits captured image data to the image accumulation apparatus 20 (step S201).

Subsequently, the face data extraction unit 21 of the image accumulation apparatus 20 extracts face image data of a person from the image data acquired from the camera 11 (step S202). Then, the face data extraction unit 21 supplies the extracted face image data to the expression classification unit 22.

Subsequently, the expression classification unit 22 analyzes the face image data acquired from the face data extraction unit 21, and generates emotion data including information obtained by classifying what kind of emotion the person has (step S203). Here, the above-described emotions are, for example, emotions such as joy, sorrow, empathy, surprise, presence, attention, confusion, disdain, disgust, and fear. Specifically, the expression classification unit 22 classifies what kind of emotion the person has by applying a predetermined image process to the face image data of the person. The predetermined image processing is, for example, extraction of feature points (or features), comparison of the extracted feature points with reference data, a convolution process of image data, a process using training data trained by machine learning, a process using training data by deep learning, and or like. However, a scheme by which the expression classification unit 22 classifies the emotions is not limited to the above-described process.

Subsequently, the emotion determination unit 25 determines whether the emotion of the person classified by the expression classification unit 22 is a specific emotion using the emotion data acquired from the expression classification unit 22 or the voice emotion classification unit 24 (step S204). Here, the specific emotion is set in advance. For example, it is assumed that the specific emotion is set to "joy". When the person emotion included in the emotion data is "joy", it is determined that the emotion of the person is the specific emotion. On the other hand, when the person emotion included in the emotion data is "sorrow", it is determined that the emotion of the person is not the specific emotion. A plurality of specific emotions such as "joy, sorrow, surprise" may be set. What specific emotion is set may be determined by a manager of the image accumulation system 200 or may be determined by the user of the terminal 30.

Then, when the emotion determination unit 25 determines that the emotion of the person classified by the expression classification unit 22 is the specific emotion (YES in step S204), a specific emotion identifier for identifying the specific emotion is generated. Then, the emotion determination unit 25 supplies the specific emotion identifier and the face image data to the individual identification unit 26, and the process proceeds to step S205. Conversely, when the emotion determination unit 25 determines that the emotion of the person classified by the expression classification unit 22 is not the specific emotion (NO in step S204), the process returns to step S201 or step S206 to be described below.

Subsequently, the individual identification unit 26 identifies the person from the acquired face image data with reference to the face recognition data stored in the face recognition data storage unit 27 and the individual data stored in the individual data storage unit 29 (step S205). When the person can be identified, the individual identification unit 26 acquires an individual identifier for identifying the person. Then, the individual identification unit 26 supplies the acquired individual identifier and specific emotion identifier to the image accumulation unit 210.

The camera 11 captures an image in the kindergarten and transmits the captured image data to the image accumulation apparatus 20. At the same time, the microphone 12 acquires a voice in the kindergarten, and transmits the acquired voice data to the image accumulation apparatus 20 (step S206).

Subsequently, the voice data extraction unit 23 extracts voice data of a predetermined person from the voice data acquired from the microphone 12 (step S207). The voice data extraction unit 23 supplies the extracted voice data to the voice emotion classification unit 24.

Subsequently, the voice emotion classification unit 24 analyzes the voice data acquired from the voice data extraction unit 23, and generates emotion data including information obtained by classifying what kind of emotion the person has (step S208). The above-described emotions are, for example, emotions such as joy, sorrow, empathy, surprise, presence, attention, confusion, disdain, disgust, and fear, similarly to the emotion analyzed by the expression classification unit 22.

Subsequently, the emotion determination unit 25 uses the emotion data acquired from the voice emotion classification unit 24 to determine whether the emotions of the persons classified by the voice emotion classification unit 24 are specific emotions (step S209). A determination method is similar to the method described in step S204. Then, when the emotion determination unit 25 determines that the emotion of the person classified by the voice emotion classification unit 24 is the specific emotion (YES in step S209), the emotion determination unit generates a specific emotion identifier for identifying the specific emotion. Then, the emotion determination unit 25 supplies the specific emotion identifier and the face image data to the individual identification unit 26, and the process proceeds to step S210. Conversely, when the emotion determination unit 25 determines that the emotion of the person classified by the voice emotion classification unit 24 is not the specific emotion (NO in step S209), the process returns to step S201 or step S206 to be described below.

Subsequently, the individual identification unit 26 identifies a person from the acquired individual voice data with reference to the voice recognition data stored in the voice recognition data storage unit 28 and the individual data stored in the individual data storage unit 29 (step S210). When the person can be identified, the individual identification unit 26 acquires an individual identifier for identifying the person. Then, the individual identification unit 26 supplies the acquired individual identifier and the specific emotion identifier to the image accumulation unit 210.

Subsequently, the image accumulation unit 210 extracts a specific image corresponding to the specific emotion from the image data acquired from the camera 11 (step S211). For example, the image accumulation unit 210 extracts, from the image data acquired from the camera 11, the specific image within the predetermined range before and after the time point at which the emotion is determined to be the specific emotion. For example, the specific image indicates a moving image for 10 seconds before and after the time point at which a child showed an emotion of "joy" among the moving images acquired from the camera 11. Then, the image accumulation unit 210 accumulates the extracted specific image, the individual identifier, and the specific emotion identifier in the image data storage unit 211 in association (step S212).

Subsequently, the image editing unit 212 edits the specific image stored in the image data storage unit 211 (step S213). For example, the image editing unit 212 analyzes the specific image stored in the image data storage unit 211, and performs a blurring process or the like of masking the face of a person other than the person corresponding to the individual identifier associated with the specific image in the stored specific image. In addition to the blurring process, the masking includes mosaic processing, a deformation process, a mask process, a process of superimposing a predetermined icon image, and the like.

After the process of step S205 or step S210, the icon notification unit 213 outputs the emotion icons to the emotion notification/image reproduction application 31 of the terminal 30 via the network N (step S214). The emotion icons are icons representing specific emotions such as "joy" and "sorrow" and at least one type of emotion icons is generated. Here, a user of the terminal 30 can select an emotion of a specific image to be reproduced by selecting the emotion icon output to the terminal 30. The icon notification unit 213 may output a time at which the specific emotion appears to the terminal 30 in association with the emotion icon.

Figure 6:
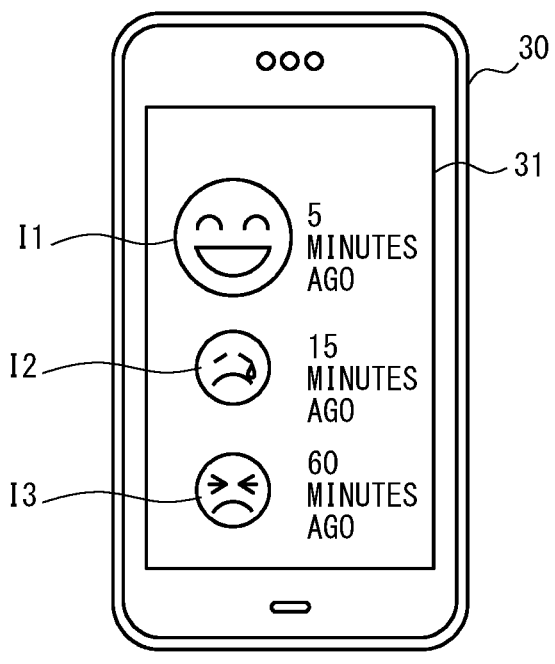
FIG. 6 is a schematic diagram illustrating an example of an output of emotion icons in the image accumulation system according to the second example embodiment.

For example, the emotion notification/image reproduction application 31 of the terminal 30 outputs the emission icons to the display as illustrated in FIG. 6. In FIG. 6, the emotion notification/image reproduction application 31 outputs an emotion icon I1 representing "joy", an emotion icon I2 representing "sorrow", and an emotion icon I3 representing "surprise". The emotion icon I1 representing "joy", the emotion icon I2 representing "sorrow", and the emotion icon representing "surprise" are associated with information of "5 minutes ago", "15 minutes ago", and "60 minutes ago", respectively. For example, information regarding "5 minutes before" associated with the emotion icon I1 representing "joy" indicates that the person indicated "joy" 5 minutes before the current time.

Subsequently, when the user of the terminal 30 selects the emotion icon of the terminal 30, the image distribution unit 214 acquires the specific image corresponding to the specific emotion identifier and the individual identifier associated with the selected emotion icon from the image data storage unit 211. Then, the image distribution unit 214 transmits the acquired image data to the terminal 30, and outputs the specific image to the emotion notification/image reproduction application 31 of the terminal 30 (step S215). For example, as illustrated in FIG. 6, when the user of the terminal 30 selects the emotion icon I1 of "joy", the image distribution unit 214 outputs the specific image at the time of "joy" to the terminal 30.

The image distribution unit 214 outputs the specific emotion identifier associated with the selected emotion icon and the specific image corresponding to the individual identifier to the terminal 30, but may output the emotion of at least one person other than the person included in the specific image and corresponding to the individual identifier together. Here, in addition to the extracted specific image, individual identifier, and specific emotion identifier, the image accumulation unit 210 accumulates the individual identifier of another person and the information regarding the emotion in association in the image data storage unit 211. Accordingly, a parent can infer a cause of an emotion (such as joy) of the child from emotions of surrounding people.

Accordingly, in the image accumulation system 200 according to the second example embodiment, a characteristic video scene can be extracted by analyzing an emotion that is an individual inner part from an external feature such as an individual expression using the individual emotion as a trigger.

By using the image accumulation system 200, the parents using the terminal 30 can know more information than what the parents hear about states of the children in the kindergarten in contact books or in interviews with teachers from the video and can store the information as data and share the data with the families. On the other hand, the kindergarten can improve a trust relationship with the parents by providing videos of the states of the children as they are. The kindergarten can evaluate educational content and the teacher by grasping the emotions of the children.

In addition, by using the image accumulation system 200, the fixed camera is used to extract a characteristic video scene of a person. Therefore, the fixed camera can be effectively used for purposes other than the monitoring purpose.

Third Example Embodiment

An image accumulation system 300 has a different use different from the image accumulation system 200 in the following points.

The image accumulation system 300 acquires, for example, a characteristic video scene of a student in an online lesson such as a music classroom. In the following example embodiments, an online lesson is a lesson held using a plurality of terminals communicably connected to each other via a communication line.

The terminal connected to the online lesson is, for example, a personal computer, a smartphone, a tablet terminal, a mobile phone with a camera, or the like. In the following example, in an online lesson, a "student" takes a lesson using a terminal different from a "teacher."

The image accumulation system 300 outputs the degree of concentration and the degree of satisfaction with the online lesson and the degree of understanding for instruction content as a report from the expression and voice of the student. Here, the report may be output in association with the specific characteristic image.

Figure 7:
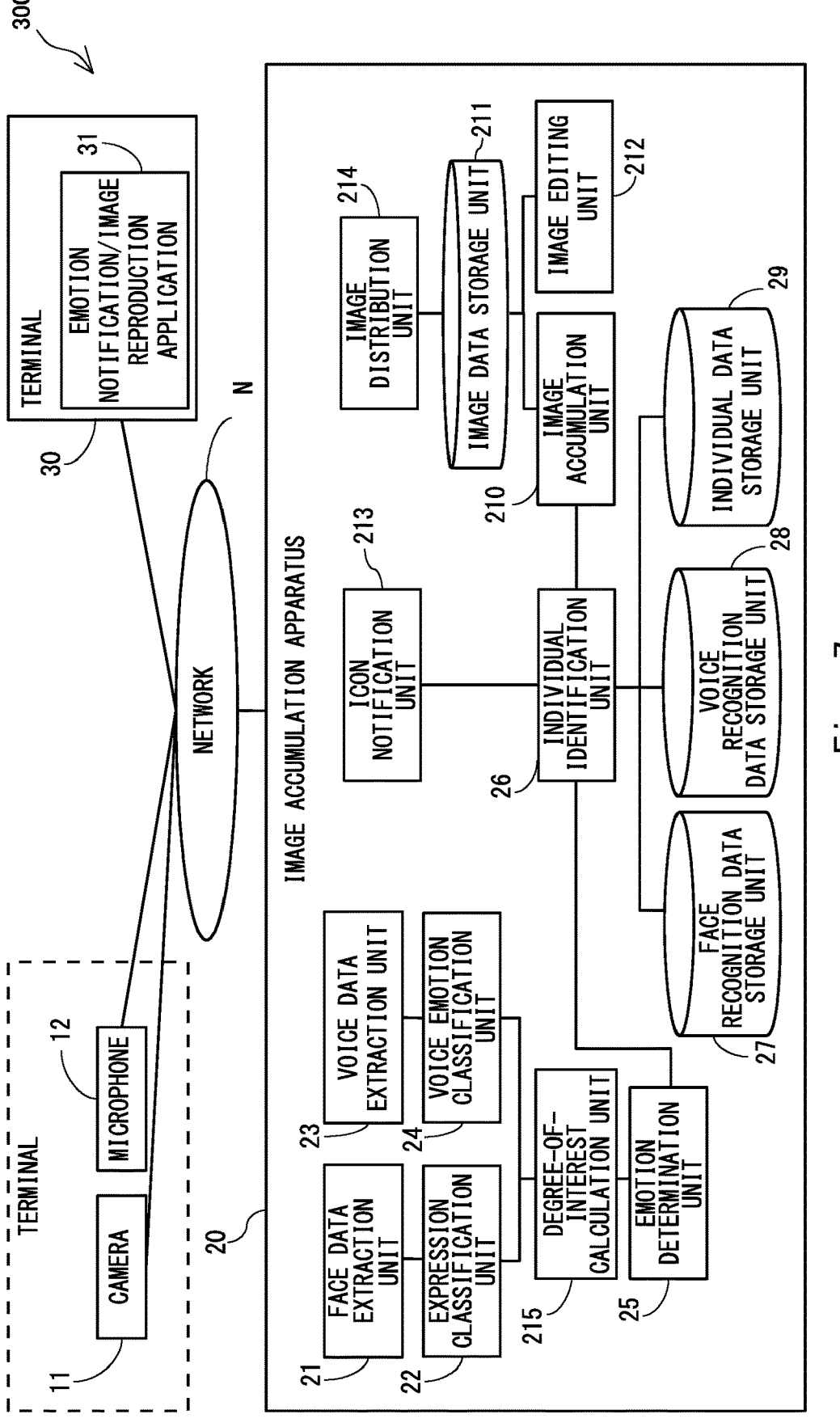
FIG. 7 is a block diagram illustrating a configuration of an image accumulation system according to a third example embodiment.

Next, a configuration of the image accumulation system 300 according to the third example embodiment will be described with reference to FIG. 7. The image accumulation system 300 includes a degree-of-interest calculation unit 215 in addition to the configuration of the image accumulation system 200.

The camera 11 and the microphone 12 are installed in, for example, a mobile terminal such as a smartphone or a tablet, or a fixed terminal such as a PC used for an online lesson. The camera 11 captures an image of a student in an online lesson. The microphone 12 acquires a voice associated with the image of the student in the online lesson. The camera 11 may capture an image of the teacher in the online lesson. The microphone 12 may acquire a voice associated with the image of the teacher in the online lesson.

The expression classification unit 22 according to the third example embodiment has the following function in addition to the function of the expression classification unit 22 according to the second example embodiment. The expression classification unit 22 classifies an emotion of a person from face image data acquired from the face data extraction unit 21, and calculates the degree of the emotion of the classified person in numerical values. For example, the expression classification unit 22 calculates the degree of attention, the degree of confusion, the degree of disdain, a sense of disgust, a sense of fear, the degree of happiness, the degree of empathy, the degree of surprise, and the presence of the person in numerical values from 0 to 100.

The voice emotion classification unit 24 according to the third example embodiment has the following functions in addition to the functions of the voice emotion classification unit 24 according to the second example embodiment. In addition to the function of the voice emotion classification unit 24 according to the second example embodiment, the voice emotion classification unit 24 classifies an emotion of a person from individual voice data acquired from the voice data extraction unit 23, and calculates the classified degree of emotion of the person in numerical values. For example, the voice emotion classification unit 24 calculates the degree of attention, the degree of confusion, the degree of disdain, the sense of disgust, the sense of fear, the degree of happiness, the degree of empathy, the degree of surprise, and the presence of a person in numerical values of 0 to 100.

Figure 8:
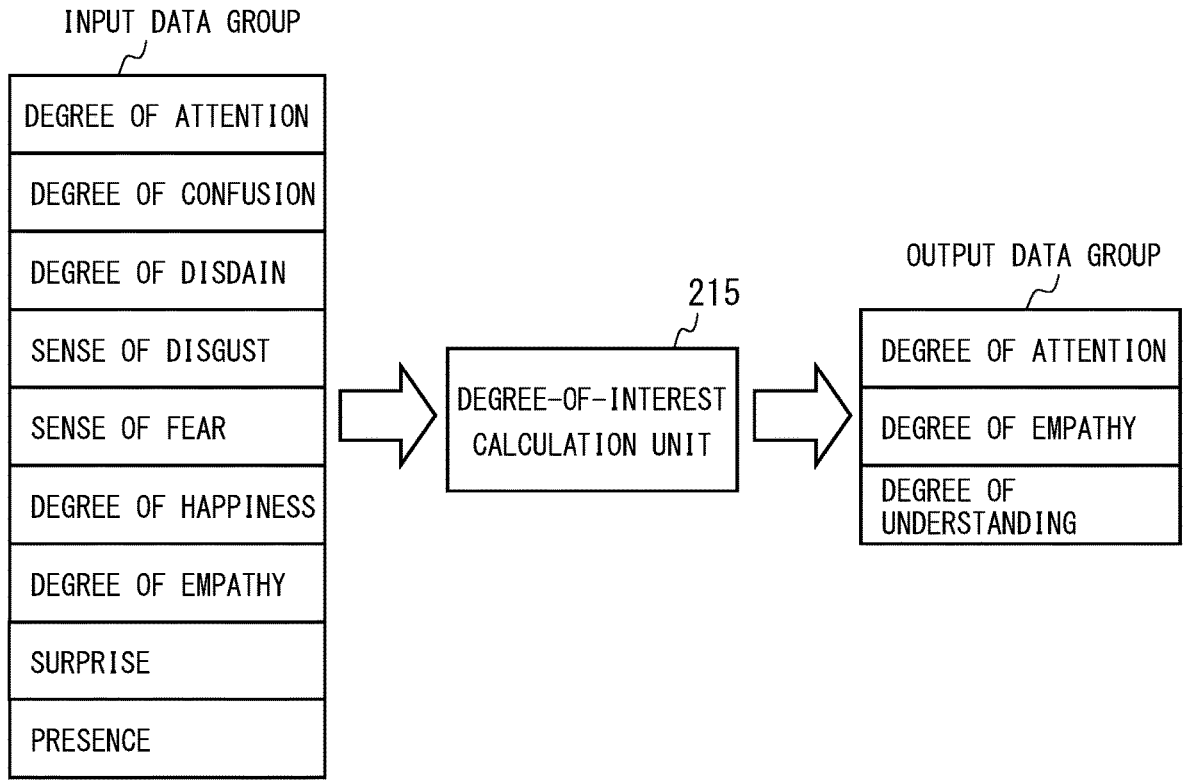
FIG. 8 is a schematic diagram illustrating a process of a degree-of-interest calculation unit in an image accumulation system according to the third example embodiment.

The degree-of-interest calculation unit 215 calculates the degree of interest (the degree of concentration, the degree of satisfaction, the degree of understanding, and the like) of the student in the lesson from a classification result of the expression classification unit 22 or the voice emotion classification unit 24. Specifically, as illustrated in FIG. 8, the degree-of-interest calculation unit 215 receives emotion data as an input data group. When the above-described input data group is received, the degree-of-interest calculation unit 215 performs a preset process and generates an output data group using the input data group. The output data group indicates the degree of interest of the user in the lesson using the image accumulation system 300. The output data group indicates, for example, the degree of concentration, the degree of satisfaction with the lesson, and the degree of understanding of instruction content. The degree of attention indicated as the output data group may be the same as or different from the level of attention included in the input data group. Similarly, the degree of empathy indicated as the output data group may be the same as or different from the degree of empathy included in the input data group.

Here, the degree-of-interest calculation unit 215 may calculate, for example, the emotion of the student in the image during the lesson or temporal transition of the degree of interest in the lesson.

The image accumulation unit 210 extracts a specific image corresponding to a predetermined range from a time point at which the emotion determination unit 25 determines that the emotion of the person is the specific emotion from the image data acquired from the camera 11, and stores the extracted specific image in the image data storage unit 211. The image accumulation unit 210 according to the third example embodiment has the following function in addition to the above-described function of the image accumulation unit 210 according to the second example embodiment. The image accumulation unit 210 stores an analysis result of the degree-of-interest calculation unit 215 corresponding to the specific image in the image data storage unit 211 in association with the specific image.

When the specific image of the student is stored in the image data storage unit 211, the image accumulation unit 210 may store the specific image of the teacher corresponding to the specific image of the student in the image data storage unit 211. When the specific image of the student is stored in the image data storage unit 211, the image accumulation unit 210 may store an emotion of the teacher or the degree of interest in the lesson of the teacher in the image data storage unit 211 in association with the specific image of the student.

The image distribution unit 214 according to the third example embodiment has the following functions in addition to the function of the image distribution unit 214 according to the second example embodiment. The image distribution unit 214 receives an instruction from the terminal 30 via the network N, acquires the specific image corresponding to the emotion icon from the image data storage unit 211, and distributes the acquired specific image to the terminal 30. At that time, the image distribution unit 214 outputs the temporal transition of the degree of interest in the lesson of the student in the specific image to the terminal 30 using, for example, a graph on a dashboard. The image distribution unit 214 outputs the emotion of the teacher or the degree of interest in the lesson of the teacher in the specific image to the terminal 30 using a graph on a dashboard or the like.

When only one person is shown in an image captured by the camera 11, such as an individual lesson, the image accumulation system 300 is not required to identify an individual, and thus may not have the configuration of the individual identification unit 26.

Accordingly, the image accumulation system 300 can extract a characteristic video scene using an individual emotion as a trigger by analyzing an emotion that is an individual inner part from an external feature such as an individual expression. Accordingly, for the teacher or the classroom to which the teacher belongs, it is possible to improve a trust relationship with the parent of the student by providing the state of the lesson of the student as a video.

The image accumulation system 300 provides the degree of interest of the student in the lesson to the teacher, the classroom to which the teacher belongs, the parent, the student, and the like. Accordingly, the teacher or the classroom to which the teacher belongs can be utilized for reflection of instruction content and future instruction policy decision from the degree of interest of the student in the lesson. The parents of the student can grasp what kind of instruction the teacher is giving to the child by checking the degree of interest of the student in the lesson and the video and can check movement of the emotion of the child, the attitude, and the congeniality to the teacher in the video.

Example of Hardware Configuration

Each functional constituent of the image accumulation apparatus 1, the camera 11, the microphone 12, the image accumulation apparatus 20, and the terminal 30 (hereinafter referred to as each apparatus) described above may be implemented by hardware (for example, a hard-wired electronic circuit or the like) that implements each functional constituent, or may be implemented in a combination of hardware and software (for example, a combination of an electronic circuit and a program that controls the electronic circuit or the like). Hereinafter, a case where each functional constituent of each apparatus is implemented by a combination of hardware and software will be further described.

Figure 9:
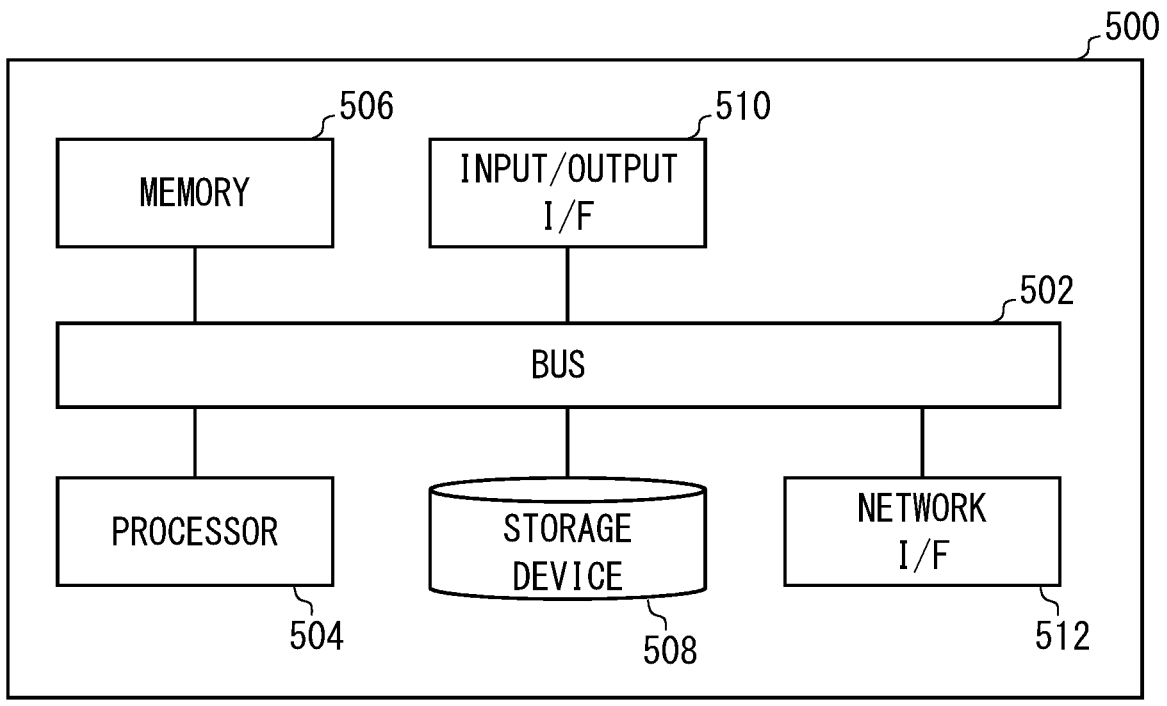
FIG. 9 is a block diagram illustrating a configuration of a computer according to the example embodiment.

FIG. 9 is a block diagram illustrating a hardware configuration of a computer. Each apparatus can be implemented by the computer 500 that has the hardware configuration illustrated in FIG. 9. The computer 500 is a portable computer such as a smartphone or a tablet terminal. Meanwhile, the computer 500 may be a portable computer or a stationary computer such as a PC. The computer 500 may be a dedicated computer designed to implement each apparatus, or may be a general-purpose computer. The computer 500 may be a stationary computer such as a personal computer (PC).

For example, by installing a predetermined application in the computer 500, the computer 500 can have a desired function. For example, an application that implements each function of each apparatus is installed in the computer 500 in a system.

The computer 500 includes a bus 502, a processor 504, a memory 506, a storage device 508, an input/output interface (I/F) 510, and a network interface (I/F) 512. The bus 502 is a data transmission path for the processor 504, the memory 506, the storage device 508, the input/output interface 510, and the network interface 512 to transmit and receive data to and from each other. However, a method of connecting the processor 504 and the like to each other is not limited to the bus connection.

The processor 504 is any of processors such as a central processing unit (CPU), a graphics processing unit (GPU), or a field-programmable gate array (FPGA). The memory 506 is a main storage device implemented by using a random access memory (RAM) or the like. The storage device 508 is an auxiliary storage device implemented by using a hard disk, a solid state drive (SSD), a memory card, read only memory (ROM), or the like.

The input/output interface 510 is an interface connecting the computer 500 and an input/output device. For example, an input device such as a keyboard and an output device such as a display device are connected to the input/output interface 510.

The network interface 512 is an interface connecting the computer 500 to a network. The network may be a local area network (LAN) or a wide area network (WAN).

The storage device 508 stores a program realizing a desired function. The processor 504 reads the program to the memory 506 and executes the program to implement each functional constituent of each apparatus.

The present invention is not limited to the above example embodiments, and can be changed as appropriate without departing from the concept thereof.

The above-described program can be stored and supplied to a computer using any of various types of non-transitory computer readable media. The non-transitory computer readable media include various types of tangible storage media. Examples of the non-transitory computer readable media include a magnetic recording medium (for example, a flexible disk, a magnetic tape, or a hard disk drive), a magneto-optical recording medium (for example, a magneto-optical disc), a compact disc-read only memory (CD-ROM), a CD-R, a CD-R/W, and a semiconductor memory (for example, a mask ROM, a programmable ROM (PROM), an erasable PROM (EPROM), a flash ROM, or a random access memory (RAM)). The program may be supplied to the computer using any of various types of transitory computer readable media. Examples of the transitory computer readable media include an electrical signal, an optical signal, and an electromagnetic wave. The transitory computer-readable media can supply programs to computers via a wired communication path such as electric wires and optical fibers, or wireless communication paths.

The present invention is not limited to the above example embodiments, and can be changed as appropriate without departing from the concept thereof.

Some or all of the above-described example embodiments may be described as in the following supplementary notes, but are not limited to the following supplementary notes.

(Supplementary Note 1)

An image accumulation apparatus including:

an image acquisition unit configured to acquire image data;

an expression classification unit configured to classify face image data included in the image data into predetermined emotions; and an image accumulation unit configured to accumulate the image data associated with emotion identifiers for identifying the classified emotions so that the image data is distributable to a terminal.

(Supplementary Note 2)

The image accumulation apparatus according to Supplementary note 1, further including:

an emotion determination unit configured to determine whether the classified emotion is a predetermined specific emotion, wherein, when the emotion determination unit determines that the classified emotion is a predetermined specific emotion, the image accumulation unit extracts a specific image corresponding to the specific emotion from the image data and accumulates the specific image associated with a specific emotion identifier for identifying the specific emotion so that the specific image is distributable to the terminal.

(Supplementary Note 3)

The image accumulation apparatus according to Supplementary note 2, wherein, when the emotion determination unit determines that the classified emotion is the predetermined specific emotion, the image accumulation unit extracts, from the image data, a specific image included within a predetermined time before and after a time point at which the classified emotion is determined to be the specific emotion, and accumulates the specific image associated with the specific emotion identifier so that the specific image is distributable to the terminal.

(Supplementary Note 4)

The image accumulation apparatus according to Supplementary note 2 or 3, further comprising an image distribution unit configured to distribute an image associated with the emotion identifier to the terminal.

(Supplementary Note 5)

The image accumulation apparatus according to Supplementary note 4, further including:

an individual identification unit configured to identify a person determined to express the specific emotion from the face image data; and an image editing unit configured to edit the specific image accumulated in the image accumulation unit, wherein the image accumulation unit stores identification information of the person determined to express the specific emotion in association with the specific image, and wherein the image editing unit masks at least one person other than the person determined to express the specific emotion in the specific image.

(Supplementary Note 6)

The image accumulation apparatus according to Supplementary note 5, further including:

an icon notification unit configured to cause a terminal to output an icon indicating the specific emotion of the person determined to express the specific emotion, wherein the icon notification unit causes the terminal to output at least one type of icon, and wherein the image distribution unit distributes the specific image corresponding to the icon selected by the user of the terminal to the terminal.

(Supplementary Note 7)

The image accumulation apparatus according to Supplementary note 5 or 6, wherein the image accumulation unit further accumulates an emotion of at least one person other than the person determined to express the specific emotion in association with the specific image to be stored, and wherein the image distribution unit distributes, to the terminal, the specific image in association with the emotion of at least one person other than the person determined to express the specific emotion.

(Supplementary Note 8)

The image accumulation apparatus according to any one of Supplementary notes 4 to 7, further including:

a degree-of-interest calculation unit configured to calculate a degree of interest in a lesson of a person based on the emotions classified by the expression classification unit, wherein the image acquisition unit accumulates the image data in association with the degree of interest in the lesson, and wherein the image distribution unit distributes the image data and the degree of interest in the lesson in association with each other to the terminal.

(Supplementary Note 9)

The image accumulation apparatus according to any one of Supplementary notes 1 to 8, further including:

a voice acquisition unit configured to acquire voice data corresponding to the image data; and a voice emotion classification unit configured to classify a person emotion from the voice data.

14

(Supplementary Note 10)

An image accumulation apparatus including:

an image acquisition unit configured to acquire image data;

a voice acquisition unit configured to acquire voice data corresponding to the image data;

a voice emotion classification unit configured to classify an emotion of a person from the voice data; and an image acquisition unit configured to accumulate the image data associated with emotion identifiers for identifying the classified emotions so that the image data is distributable to a terminal.

(Supplementary Note 11)

The image accumulation apparatus according to Supplementary note 10, further comprising:

an emotion determination unit configured to determine whether the classified emotion is a predetermined specific emotion, wherein, when the emotion determination unit determines that the classified emotion is the predetermined specific emotion, the image accumulation unit extracts a specific image corresponding to the specific emotion from the image data and accumulates the specific image associated with a specific emotion identifier for identifying the specific emotion so that the specific image is distributable to the terminal.

(Supplementary Note 12)

A method including:

acquiring image data;

classifying face image data included in the image data into predetermined emotions; and accumulating the image data associated with emotion identifiers for identifying the classified emotions so that the image data is distributable to a terminal.

(Supplementary Note 13)

A program causing a computer to perform:

a process of acquiring image data;

a process of classifying face image data included in the image data into predetermined emotions; and a process of accumulating the image data associated with emotion identifiers for identifying the classified emotions so that the image data is distributable to a terminal.

This application claims priority based on Japanese Patent Application No. 2021-029035 filed on Feb. 25, 2021, the entire disclosure of which is incorporated herein.

REFERENCE SIGNS LIST

1 IMAGE ACCUMULATION APPARATUS
11 IMAGE ACQUISITION UNIT (CAMERA)
12 VOICE ACQUISITION UNIT (MICROPHONE)
20 IMAGE ACCUMULATION APPARATUS
21 FACE DATA EXTRACTION UNIT
22 EXPRESSION CLASSIFICATION UNIT
23 VOICE DATA EXTRACTION UNIT
24 VOICE EMOTION CLASSIFICATION UNIT
25 EMOTION DETERMINATION UNIT
26 INDIVIDUAL IDENTIFICATION UNIT
27 FACE RECOGNITION DATA STORAGE UNIT
28 VOICE RECOGNITION DATA STORAGE UNIT 28
29 INDIVIDUAL DATA STORAGE UNIT
30 TERMINAL
31 EMOTION NOTIFICATION/IMAGE REPRODUC-
TION APPLICATION
200 IMAGE PROCESSING SYSTEM
210 IMAGE ACCUMULATION UNIT

211 IMAGE DATA STORAGE UNIT
212 IMAGE EDITING UNIT
213 ICON NOTIFICATION UNIT
214 IMAGE DISTRIBUTION UNIT
215 DEGREE-OF-INTEREST CALCULATION UNIT
300 IMAGE PROCESSING SYSTEM
500 COMPUTER
502 BUS
504 PROCESSOR
506 MEMORY
508 STORAGE DEVICE
510 INPUT/OUTPUT INTERFACE (I/F)
512 NETWORK INTERFACE (I/F)
N NETWORK

What is claimed is:

1. An image accumulation apparatus comprising:
at least one memory storing instructions, and
at least one processor configured to execute the instructions to:
acquire image data from a camera installed in a facility, the image data being captured of one or more people in the facility by the camera;
classify face image data included in the image data into predetermined emotions by extracting a plurality of feature points from the image data and comparing the plurality of extracted feature points with reference data;
based on face image data being classified as a predetermined specific emotion, extract a specific image corresponding to the specific emotion from the image data and accumulate the specific image associated with a specific emotion identifier for identifying the specific emotion so that the specific image is distributable to a terminal;
identify a person determined to express the specific emotion from the face image data;
edit the specific image accumulated by masking at least one person other than the person determined to express the specific emotion in the specific image;
store identification information of the person determined to express the specific emotion in association with the specific image; and
based on a selection of an icon corresponding to the specific emotion by the terminal, distribute an image associated with the emotion identifier and the identification information of the person determined to express the specific emotion to the terminal.

2. The image accumulation apparatus according to claim 1, wherein the at least one processor is further configured to execute the instructions to, in a case where the classified emotion is determined to be the predetermined specific emotion, extract, from the image data, a specific image included within a predetermined time before and after a time point at which the classified emotion is determined to be the specific emotion, and accumulate the specific image associated with the specific emotion identifier so that the specific image is distributable to the terminal.

3. The image accumulation apparatus according to claim 1, wherein the at least one processor is further configured to execute the instructions to cause the terminal to output the icon indicating the specific emotion of the person determined to express the specific emotion,
wherein the at least one processor is further configured to execute the instructions to:
cause the terminal to output at least one type of icon; and
distribute the specific image corresponding to the icon selected by the user of the terminal to the terminal.

4. The image accumulation apparatus according to claim 1, wherein the at least one processor is further configured to execute the instructions to:
accumulate an emotion of at least one person other than the person determined to express the specific emotion in association with the specific image to be stored; and
distribute, to the terminal, the specific image in association with the emotion of at least one person other than the person determined to express the specific emotion.

5. The image accumulation apparatus according to claim 1, wherein the at least one processor is further configured to execute the instructions to:
calculate a degree of interest in a lesson of the person based on the emotions classified;
accumulate the image data in association with the degree of interest in the lesson; and
distribute the image data and the degree of interest in the lesson in association with each other to the terminal.

6. The image accumulation apparatus according to claim 1, wherein the at least one processor is further configured to execute the instructions to:
acquire voice data corresponding to the image data; and
classify an emotion of the person from the voice data.

7. A method comprising:
acquiring image data from a camera installed in a facility, the image data being captured of one or more people in the facility by the camera;
classifying face image data included in the image data into predetermined emotions by extracting a plurality of feature points from the image data and comparing the plurality of extracted feature points with reference data;
based on face image data being classified as a predetermined specific emotion, extracting a specific image corresponding to the specific emotion from the image data and accumulating the specific image associated with a specific emotion identifier for identifying the specific emotion so that the specific image is distributable to a terminal;
identifying a person determined to express the specific emotion from the face image data;
editing the specific image accumulated by masking at least one person other than the person determined to express the specific emotion in the specific image;
storing identification information of the person determined to express the specific emotion in association with the specific image; and
based on a selection of an icon corresponding to the specific emotion by the terminal, distributing an image associated with the emotion identifier and the identification information of the person determined to express the specific emotion to the terminal.

8. A non-transitory computer-readable medium storing a program causing a computer to perform:
acquiring image data from a camera installed in a facility, the image data being captured of one or more people in the facility by the camera;
classifying face image data included in the image data into predetermined emotions by extracting a plurality of feature points from the image data and comparing the plurality of extracted feature points with reference data;
based on face image data being classified as a predetermined specific emotion, extracting a specific image corresponding to the specific emotion from the image data and accumulating the specific image associated with a specific emotion identifier for identifying the specific emotion so that the specific image is distributable to a terminal;

identifying a person determined to express the specific emotion from the face image data;

editing the specific image accumulated by masking at least one person other than the person determined to express the specific emotion in the specific image:

storing identification information of the person determined to express the specific emotion in association with the specific image; and based on a selection of an icon corresponding to the specific emotion by the terminal, distributing an image associated with the emotion identifier and the identification information of the person determined to express the specific emotion to the terminal.

9. The method according to claim 7, wherein, in a case where the classified emotion is determined to be the predetermined specific emotion, extracting, from the image data, a specific image included within a predetermined time before and after a time point at which the classified emotion is determined to be the specific emotion, and accumulating the specific image associated with the specific emotion identifier so that the specific image is distributable to the terminal.

10. The non-transitory computer-readable medium storing a program according to claim 8 causing a computer to perform in a case where the classified emotion is determined to be the predetermined specific emotion, extracting, from the image data, a specific image included within a predetermined time before and after a time point at which the classified emotion is determined to be the specific emotion, and accumulating the specific image associated with the specific emotion identifier so that the specific image is distributable to the terminal.

11. The image accumulation apparatus according to claim 1, wherein the at least one processor is further configured to execute the instructions not to mask at least one other person determined to express the specific emotion in the specific image.

12. The image accumulation apparatus according to claim 1, wherein the masking includes at least one of: a mosaic process, a deformation process, or a process of superimposing a predetermined icon image.

13. The method according to claim 7, wherein the method further comprises not masking at least one other person determined to express the specific emotion in the specific image.

14. The method according to claim 7, wherein the masking includes at least one of: a mosaic process, a deformation process, or a process of superimposing a predetermined icon image.

15. The non-transitory computer-readable medium storing a program according to claim 8 causing a computer to perform not masking at least one other person determined to express the specific emotion in the specific image.

16. The non-transitory computer-readable medium storing a program according to claim 8, wherein the masking includes at least one of: a mosaic process, a deformation process, or a process of superimposing a predetermined icon image.

* * * * *